(12) United States Patent
Bergeron et al.

(10) Patent No.: US 8,155,383 B2
(45) Date of Patent: *Apr. 10, 2012

(54) SELECTIVE AND ADAPTIVE ILLUMINATION OF A TARGET

(75) Inventors: Alain Bergeron, chemin Saint-Louis (CA); Hubert Jerominek, rue Annette-Leclerc (CA)

(73) Assignee: Institut National D'Optique

(*) Notice: Subject to any disclaimer, the term of this patent is extended or adjusted under 35 U.S.C. 154(b) by 0 days.

This patent is subject to a terminal disclaimer.

(21) Appl. No.: 13/279,552

(22) Filed: Oct. 24, 2011

(65) Prior Publication Data

US 2012/0033857 A1    Feb. 9, 2012

Related U.S. Application Data

(62) Division of application No. 12/249,436, filed on Oct. 10, 2008, now Pat. No. 8,081,797.

(51) Int. Cl.
*G06K 9/00* (2006.01)
*F21V 7/04* (2006.01)
(52) U.S. Cl. .................. 382/103; 382/165; 382/611
(58) Field of Classification Search .......... 382/100, 382/103, 106, 162, 165, 168, 173, 181, 224, 382/232, 254, 274, 275, 276, 284, 291, 305, 382/312; 701/49; 362/303, 465, 611; 352/49; 715/745; 356/425

See application file for complete search history.

(56) References Cited

U.S. PATENT DOCUMENTS

| | | | |
|---|---|---|---|
| 4,985,816 A * | 1/1991 | Seko et al. ........... | 362/303 |
| 6,497,503 B1 * | 12/2002 | Dassanayake et al. ..... | 362/465 |
| 6,658,337 B2 * | 12/2003 | Horii et al. ........... | 701/49 |
| 7,227,611 B2 * | 6/2007 | Hull et al. ............ | 352/49 |
| 2002/0080999 A1 * | 6/2002 | Bani-Hashemi et al. ..... | 382/103 |
| 2002/0180973 A1 * | 12/2002 | MacKinnon et al. ....... | 356/425 |
| 2007/0234220 A1 * | 10/2007 | Khan et al. ........... | 715/745 |

FOREIGN PATENT DOCUMENTS

| | | |
|---|---|---|
| EP | 0814344 | 12/1997 |
| WO | 9905857 | 2/1999 |
| WO | 0163335 | 8/2001 |

* cited by examiner

*Primary Examiner* — Seyed Azarian
(74) *Attorney, Agent, or Firm* — Norton Rose Canada LLP (57) ABSTRACT

There are provided a method and a system for illuminating one or more target in a scene. An image of the scene is acquired using a sensing device that may use an infrared sensor for example. From the image, an illumination controller determines an illumination figure, such that the illumination figure adaptively matches at least a position of the target in the image. The target is the selectively illuminated using an illumination device, according to the illumination figure.

17 Claims, 7 Drawing Sheets

SELECTIVE AND ADAPTIVE ILLUMINATION OF A TARGET

CROSS-REFERENCE TO RELATED APPLICATION

The present patent application is a divisional of U.S. patent application Ser. No. 12/249,436, filed on Oct. 10, 2008 now U.S. Pat. No. 8,081,797, and incorporated herein by reference.

TECHNICAL FIELD

The present description generally relates to the illumination of a target. More specifically, the present description relates to the selective and adaptive illumination of a target.

BACKGROUND OF THE ART

Various applications exist where the illumination of a target object or being is required for its observation to provide easier detection, classification, recognition, identification or tracking of the target. Examples for such applications include perimeter security and surveillance, police search operation, search and rescue, firefighting, industrial inspection, maintenance and road safety. Such illumination of a target is generally required, for example, when there is a need to observe or locate the target in adverse conditions such as during night, in a cluttered environment or in the presence of smoke, fog or dust.

Some sensors exist which provide the capability to detect targets in night conditions. An example of such sensors includes infrared sensors which detect the heat emitted by the target instead of visible light reflected by the object. However, infrared sensors do not allow for direct observation by human, observation by human via visible-waveband observation devices or observation by automatic observation devices that operate in other wavebands than infrared.

SUMMARY

It is an aim of the present application to provide a system and a method that address issues associated with the prior art.

There are provided a system and a method for selectively and adaptively illuminating a target. The system and the method use an illumination device which selectively illuminates only the target(s) and does not illuminate the surrounding environment, to create or amplify an illumination contrast between the target and the surrounding environment.

An image of the scene is first acquired using a sensing device that may use an infrared sensor for example. An illumination figure is calculated according to the shape and position of the target in the scene, as observed by the sensing device. The target is then selectively illuminated with the calculated illumination figure.

Accordingly, if the illumination figure is updated in time as the target moves, the illumination tracks the target in the scene in real-time, to create or amplify an illumination contrast between the target and the surrounding environment.

It is noted that more than one target may be present in the scene and illuminated simultaneously.

The illumination device uses a sensor array to acquire an image of the scene. The image is then processed to extract a position and a shape of a target or targets. An illumination figure corresponding to the shape of the target(s) is calculated and sent to an illumination array that illuminates the scene. The illumination array is coupled to illumination imaging optics to project an illumination light with the illumination figure projected in the far-field, in order to obtain a superposition of the illumination figure with the target(s). The image acquired with the sensor array and the projected illumination figure are both co-registered so that an area in the scene corresponds to a pixel in the image and also corresponds to a corresponding pixel in the illumination figure. The device consequently provides selective illumination of the target(s), creating or amplifying a visual contrast of the target(s) against its background. Updating the illumination figure in time as a target moves allows for tracking of a target according to its displacements and the evolution of its shape.

There are provided a method and a system for illuminating one or more target in a scene. An image of the scene is acquired using a sensing device that may use an infrared sensor for example. From the image, an illumination controller determines an illumination figure, such that the illumination figure adaptively matches at least a position of the target in the image. The target is the selectively illuminated using an illumination device, according to the illumination figure.

In accordance with one aspect, there is provided a system for illuminating at least one target in a scene. The system comprises an input for receiving an image acquired on the scene, the image comprising the target; an illumination device having an illumination field and adapted to illuminate a selected portion only of the illumination field according to an illumination figure for selectively illuminating the target in the illumination field; and an illumination controller for determining the illumination figure from the image such that the portion adaptively matches at least a position of the target in the image, the illumination figure being determined according to a known registration between the image and the illumination field.

In accordance with another aspect, there is provided a method for illuminating at least one target in a scene. The method comprising: acquiring an image of the scene, the image comprising the target; determining, from the image, an illumination figure defined on an illumination field, such that the illumination figure adaptively matches at least a position of the target in the image, the illumination figure being determined according to a known registration between the image and the illumination field; and illuminating a selected portion only of the illumination field according to the illumination figure for selectively illuminating the target in the illumination field.

In this specification, the term "target" is intended to mean any object or being which is to be the subject of an observation, in contrast with any other object or being which is considered to be part of a background or surrounding environment and on which no special attention is to be drawn.

BRIEF DESCRIPTION OF THE DRAWINGS

It will be noted that throughout the appended drawings, like features are identified by like reference numerals.

DETAILED DESCRIPTION

Figure 1:
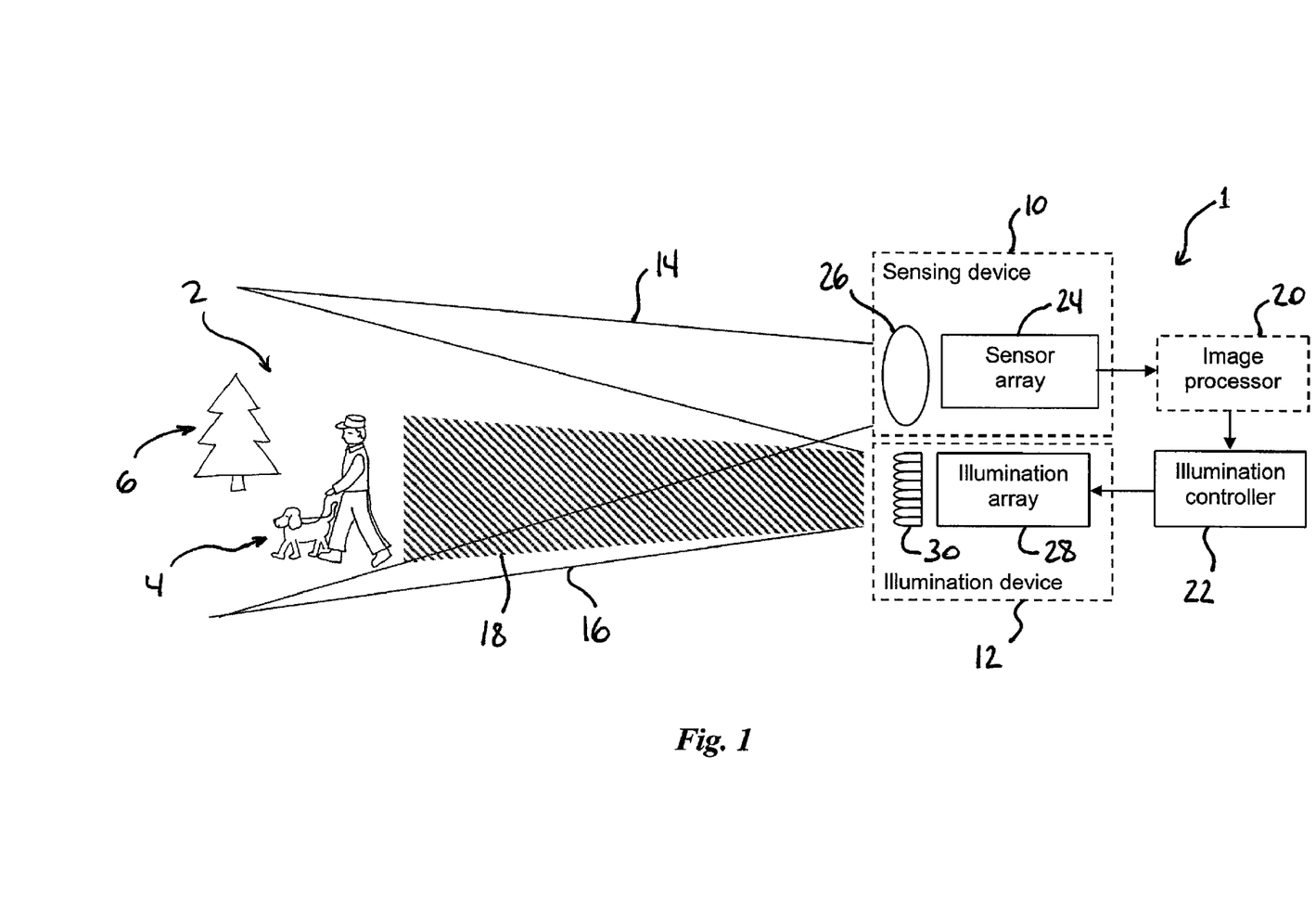
FIG. 1 is a block diagram illustrating a system for selectively and adaptively illuminating a target in a scene, as shown in relation with the scene to be illuminated.

Now referring to the drawings, FIG. 1 illustrates a system 1 for selectively and adaptively illuminating a target 4 in a scene 2, the target 4 being shown in relation with the scene 2. The scene 2 typically includes one or more target object or being, typically in movement in a surrounding environment 6 (simply illustrated herein as a pine tree). The system 1 selectively illuminates the target 4 while limiting its illumination of the surrounding environment 6, in order to create or amplify an illumination contrast between the target 4 and the surrounding environment 6. Even though reference to only one target will be made generally throughout the description, it is noted that more than one distinct target 4 may be present in the scene 2 and selectively and distinctively illuminated.

The system 1 comprises a sensing device 10, an illumination device 12, an image processor 20 and an illumination controller 22. The sensing device 10 acquires an image of the scene 2 in order to locate in the scene 2 the target 4 to be illuminated. The sensing device 10 has a sensing field of view 14 which defines how the scene 2 projects onto the sensing device 10 to produce the image. Similarly, the illumination device 12 is able to illuminate an illumination field 16 in front of the illumination device 12. In the embodiment illustrated in FIG. 1, the sensing field of view 14 essentially corresponds to the illumination field 16 such that the scene 2 appearing on the image is in register with the illumination field 16. However, the illumination device 12 is adapted to illuminate a selected portion only of the illumination field 16 by an adaptive beam 18 in order to selectively illuminate the target 4. The illuminated target 4 then acts as a screen which receives the illumination and all the attention of an observer is consequently directed to the illuminated target 4.

When in operation, images of the scene 2 are first acquired by the sensing device 10 in order to locate the target 4 in the scene. The acquired images are processed by the image processor 20 in order to extract from the images the position and the shape of the target 4 within the scene 2. The extracted position and shape are provided to the illumination controller 22 which determines, from the extracted position and the shape of the target 4 in the images, an illumination figure that is used by the illumination device 12 in forming the adaptive beam 18 to illuminate the scene 2 such that the portion illuminated substantially matches the shape and the position of the target 4. The determination of the illumination figure takes into account a known registration between the sensing field of view 14 and the illumination field 16.

It is noted that, in some embodiments, the image processing required on the image to extract the position and the shape of the target 4 consists of applying a threshold on pixel values of the acquired image. This processing may be included in the sensing device 10. The images, to which the threshold has been applied, is then directly provided to the illumination controller 22 which directly converts it into a matching illumination figure. The image processor 20 is therefore considered to be optional. This will be readily understood from the description of FIGS. 2A-2E.

In the embodiment of FIG. 1, the sensing device 10 is an infrared sensor, e.g. an infrared camera. The body of any being, i.e. a human being or an animal, generates heat that is detected by infrared sensors. Other objects such as vehicles in general also typically produce heat that can also be detected by infrared sensors. Accordingly, detection of this heat using an infrared sensor allows the location of a target 4 in the scene 2. The sensing device 10 may also operate in the x-ray spectrum, the ultra-violet spectrum, the near-infrared spectrum, the mid-infrared spectrum, the long-infrared spectrum or the terahertz spectrum for example.

The sensing device 10 comprises a sensor array 24, such as a microbolometer for example, and sensor imaging optics 26 placed in front of the sensor array 24 and consisting of one or a plurality of lenses used to adequately project the electromagnetic field received onto the sensor array 24. The sensor imaging optics 26 defines the sensing field of view 14 for the image acquisition. Other types of sensor arrays 24 may also be used such as vanadium oxide ($VO_x$) sensors, mercury cadmium telluride (MCT) sensors, indium antimonide (InSb) sensors and resistive amorphous silicon sensors. Also, if the sensing device operates in the visible or the ultra-violet spectrum, a Charge-Coupled Device (CCD) or a Complementary Metal-Oxide-Semiconductor (CMOS) may be used. Other sensing devices may also be used as well.

The illumination device 12 comprises an illumination array 28 which comprises an array of light sources, such as an array of laser diodes or of light-emitting diodes, and illumination imaging optics 30 disposed in front of the illumination array 28. Each light source of the illumination array 28 provides an illumination that is spatially separated from the illumination of the adjacent light sources. Accordingly, by activating selected light sources, it is possible to create an adaptive illumination figure or pattern for the adaptive beam 18 that corresponds to the shape and the position of the target 4, such that most of the light is screened by the target 4. The illumination imaging optics 30 consists of a lens array in this case and is used to adequately reproduce the illumination figure produced by the illumination array 28 in the far-field, i.e. on the scene 2.

Now referring to FIG. 2, the operation of the system 1 is being described. FIG. 2A illustrates the scene 2 as appearing in the sensing field of view 14. FIG. 2B illustrates the image 210 of the scene acquired by the sensing device 10, after processing by the image processor 20. The image processor 20 may apply any processing algorithm to the image 210 so as to obtain a clean enough image of the scene 2 to allow the locating of the target 4. The image is divided in an array of pixels 212 defined by the pixels of the sensor array 24. In the illustrated embodiment, the sensor device 10 is an infrared sensor. In this case, each pixel is simply associated with an infrared intensity value. A high intensity value indicates the presence of a target 4 on that pixel. Accordingly, heat emitted by the human and the dog are preferentially detected in comparison with the surrounding environment. The intensity values show different levels of intensity as a function of the level of electromagnetic radiation received from the scene. In this case, the image processing applied on the image 210 consists in applying a given threshold to the infrared intensity value of each pixel, to determine whether the pixels correspond to the background or to a target to be illuminated. In FIG. 2B, some pixels with a high intensity level are shown at 214, while other pixels with a lower intensity level are shown at 214, and pixels with an intensity level below the given threshold are shown at 212.

Figure 2A:
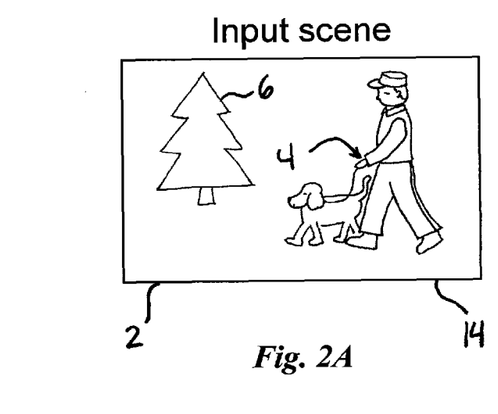
FIG. 2A is a schematic view illustrating the input scene as viewed by the system of FIG. 1.
Figure 2B:
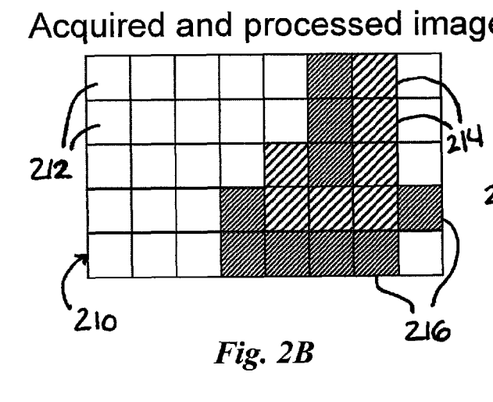
FIG. 2B is a schematic view illustrating an image acquired the system of FIG. 1.
Figure 2C:
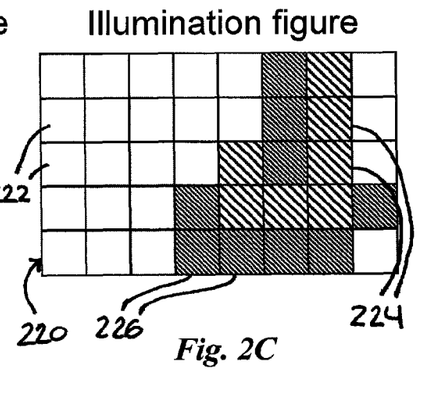
FIG. 2C is a schematic view illustrating an illumination figure to be used by the system of FIG. 1 to illuminate the scene.

FIG. 2C illustrates the illumination FIG. 220 to be used to illuminate the scene 2 with the adaptive beam 18, as determined by the illumination controller 22 from the image 210 so as to adapt the illumination to the detected target 4. Each pixel 222 of the illumination FIG. 220 typically corresponds to a light source of the illumination array 28, such that each pixel 222 is used to illuminate a specific area of the illumination field 16. Pixels 222 of the illumination FIG. 220 that are activated, i.e. pixels 224 and pixels 226, define the portion of the illumination field 16 that is illuminated. The pixels 224 and 226 of the illumination FIG. 220 correspond to a pixel 214 and 216 of the image where heat is detected. Pixels 224 and 226 are therefore activated. All pixels 222 corresponding to pixels 212 where no heat is detected are deactivated. It is noted that the illumination FIG. 220 may also include intensity levels for the illumination. For pixels 214 showing a high intensity level on the image 210, a high intensity illumination is also used (shown as by pixels 224 in FIG. 2C), and for pixels 216 showing a low intensity level on the image 210, a low intensity illumination is also used (shown by pixels 226 in FIG. 2C).

In the illustrated case, each pixel of the image 210 directly corresponds to a pixel of the illumination FIG. 220 such that the mapping between the image 210 and the illumination FIG. 220 is directly obtained. The image 210 and the illumination FIG. 220 are then impliedly co-registered such that a same pixel in the image 210 and the illumination FIG. 220 matches to correspond to the same area on the scene. There is a correspondence, pixel-by-pixel, between the topology of the sensor array 24, the topology of the illumination array 28 and the topology of the scene 2.

In other cases, the image 210 and the illumination FIG. 220 may have different numbers of pixels, i.e. different resolutions, and may cover slightly different field of views. In this case, the registration, i.e. the mapping, referencing the image 210 and the illumination FIG. 220 from one another is not direct and is known and used by the illumination controller 22 to map pixels of the image 210 to pixels of the illumination FIG. 220.

Figure 2D:
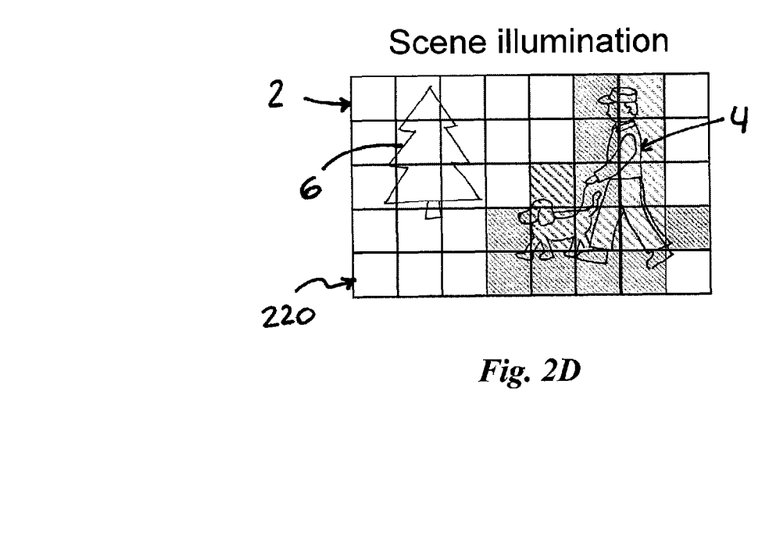
FIG. 2D is a schematic view illustrating the illumination figure projected on the scene.
Figure 2E:
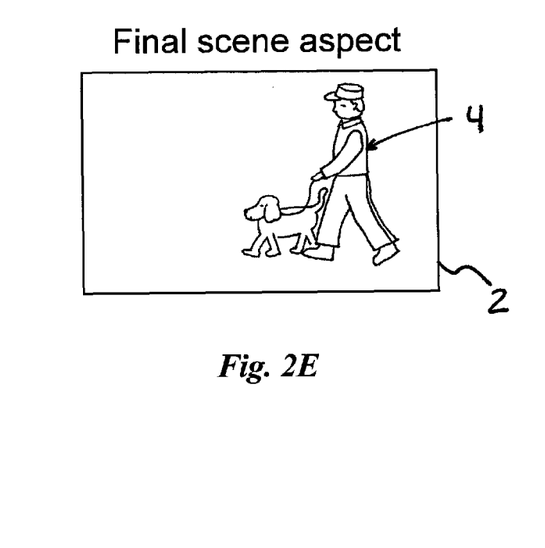
FIG. 2E is a schematic view illustrating the final aspect of the scene as illuminated by the system of FIG. 1.

FIG. 2D illustrates the illumination FIG. 220 as projected on the scene 2. Only the selected portion of the illumination field 16 corresponding to the detected target 4 is illuminated. FIG. 2E illustrates the final aspect of the scene 2 as illuminated by the adaptive beam 18. The target 4 is selectively illuminated in the scene 2 and therefore better contrasts against its surrounding environment 6.

As the shape and the position of the target 4 change, i.e. as the target 4 moves in the scene, the system 1 updates the illumination FIG. 220 in real-time, so that it continues to illuminate the target 4. Accordingly, the system 1 continues to illuminate the target 4 when its position, scale or aspect changes. The illumination tracks the target 4 in the scene 2.

In the embodiment described with reference to FIGS. 2A-2E, the illumination FIG. 220 is adapted to match the shape and the position of the target 4 from information provided by the image 210. In another embodiment, the illumination figure is such that only the central portion, or any other portion, of the target 4 is illuminated with a predetermined shape that is not necessarily matching the one of the target 4. A solid circle or square is simply used no matter the shape of the target 4. It is noted that the dimensions of such a shape non-matching illumination figure may still be adapted to the dimensions of the target 4 such that a portion of the target 4 is illuminated while limiting the illumination of the surrounding environment 6.

In the case illustrated in FIG. 2, the sensing device 10 operates in the infrared spectrum and the infrared intensity as appearing on the image 210, which is representative of the shape and position of the target 4 in the scene 2, is simply converted into an illumination FIG. 220. The optional image processor 20 may then be considered as omitted since the sensing device 10 intrinsically extracts the shape and the position of the target. It is noted that in the case of a sensing device 10 not operating in the infrared spectrum but rather in a different electromagnetic spectrum, conversion of the acquired image into an illumination figure may be more complex. The image processor 20 is then used to extract the shape and the position of the target 4 in the image 210. The target 4 should be first extracted in the image 210 from different parameters. For example, extraction of a target 4 in the image 210 may be based on movement such that the part of the image that changes in time may be identified as a target 4. A predetermined shape or color of a target may also be looked for in the image. A recognition algorithm may then be used.

Furthermore, it is noted that if the scene 2 includes more than one target 4, the illumination FIG. 220 simply adapts to illuminate more than one distinct portion of the illumination field corresponding to the different targets 4.

FIGS. 3 to 6 show different example embodiments of the illumination device 12. It is noted that the cross-section views of FIGS. 3 to 5 only show one-dimension arrays of light sources for simplicity purposes. It should be understood that the arrays are actually two-dimensional.

Figure 3:
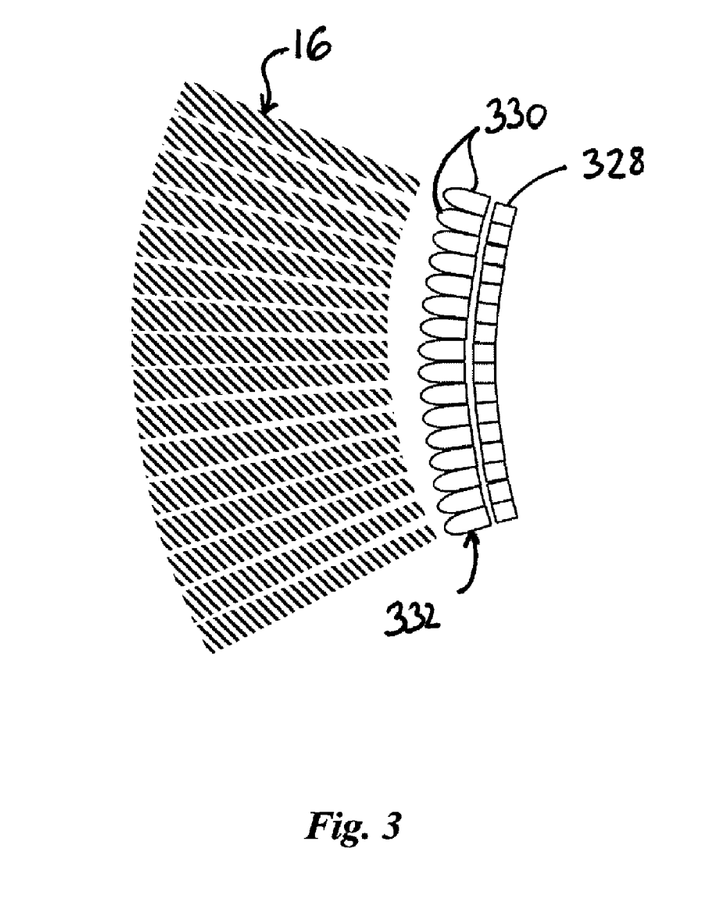
FIG. 3 is a schematic view of an example illumination device to be used in the system of FIG. 1, wherein the illumination device comprises an array of light sources combined with a lens array.

FIG. 3 shows an example embodiment of the illumination device 12. In the embodiment of FIG. 3, the light sources 328 are generally disposed side-by-side on a concave surface. A lens 330 is placed in front of each light source 328 so as to define a lens array 332. The hatching on FIG. 3 represents the illumination angle of each light source-lens combination. Generally speaking, the rotation angle between consecutive light sources 328 is equal to the illumination angle (the divergence of light source-lens combination). The summation of all the illumination angles defines the illumination field 16. The lenses 330 are chosen so that the shape of the illumination figure generated by the illumination device is preserved in the far-field, i.e. at the position of the target 4. It is noted that each lens 330 may consist of a single lens element or of a multiple lens element, i.e. a compound lens.

Figure 4:
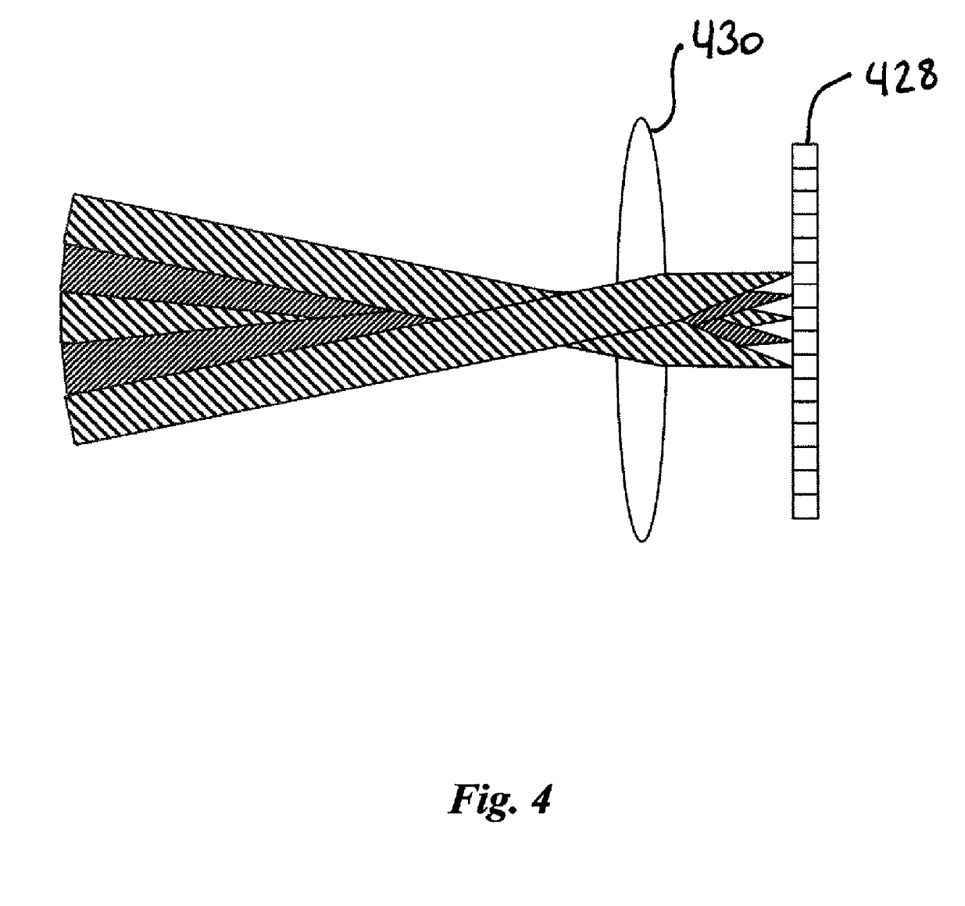
FIG. 4 is a schematic view of another example illumination device to be used in the system of FIG. 1, wherein the illumination device comprises an array of light sources combined with a lens element.

FIG. 4 shows another example embodiment of the illumination device 12. In the embodiment of FIG. 4, the light sources 428 are disposed side-by-side on a substantially planar surface. The illumination imaging optics consist of a focusing lens 430 and is disposed in front of the light sources 428 such that the light sources 428 are located at or near the front focal point of the lens 430. The focusing lens 430 preserves the illumination FIG. 220 in the far-field such that the adaptive beam 18 is similar to the target 4 in terms of shape and position. It is noted that the focusing lens 430 may consist of a single or a multiple lens element.

Figure 5:
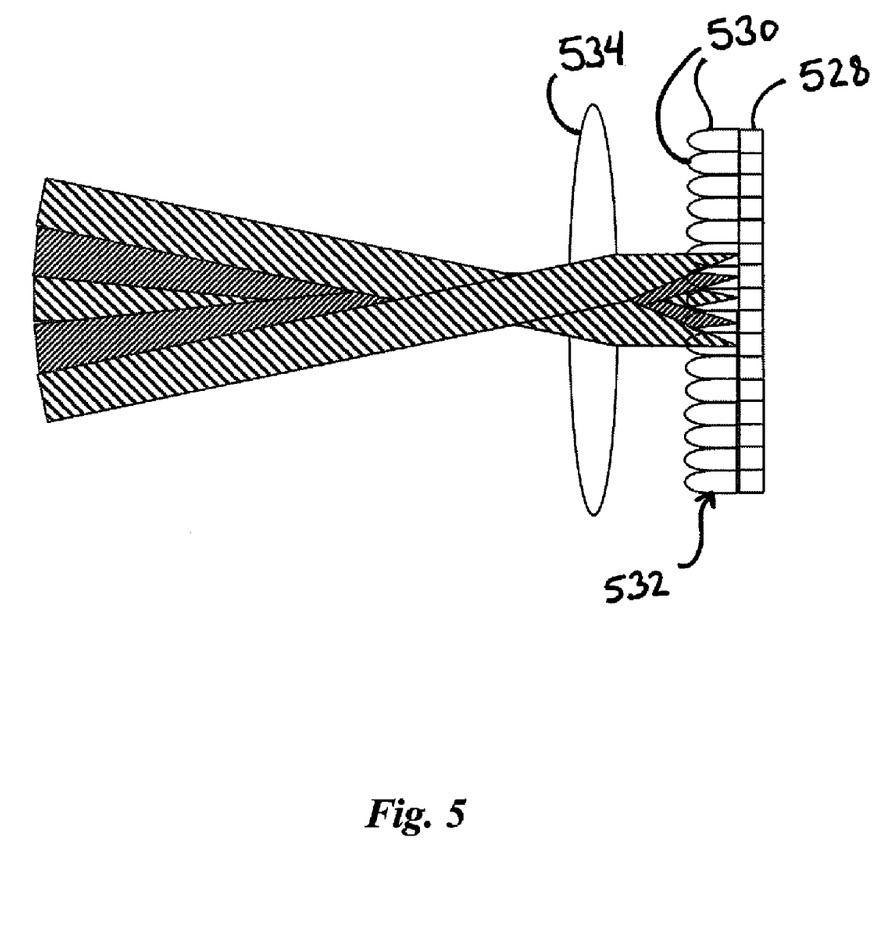
FIG. 5 is a schematic view of yet another example illumination device to be used in the system of FIG. 1, wherein the illumination device comprises an array of light sources combined with a lens array and a lens element.

FIG. 5 shows still another example embodiment of the illumination device 12. In the embodiment of FIG. 5, the light sources 528 are also disposed side-by-side on a substantially planar surface. A lens 530 is placed in front of each light source 528 so as to define a lens array 532. A focusing lens 534 is additionally disposed in front of the lens array 532 such that the lens array 532 is located at or near the front focal point of the lens 534. The illumination imaging optics, which consist of the lens array 532 and the focusing lens 534, is designed to preserve the illumination FIG. 220 in the far-field. Again, the lenses 530 and the focusing lens 534 may each consist of a single or a multiple lens element.

Figure 6:
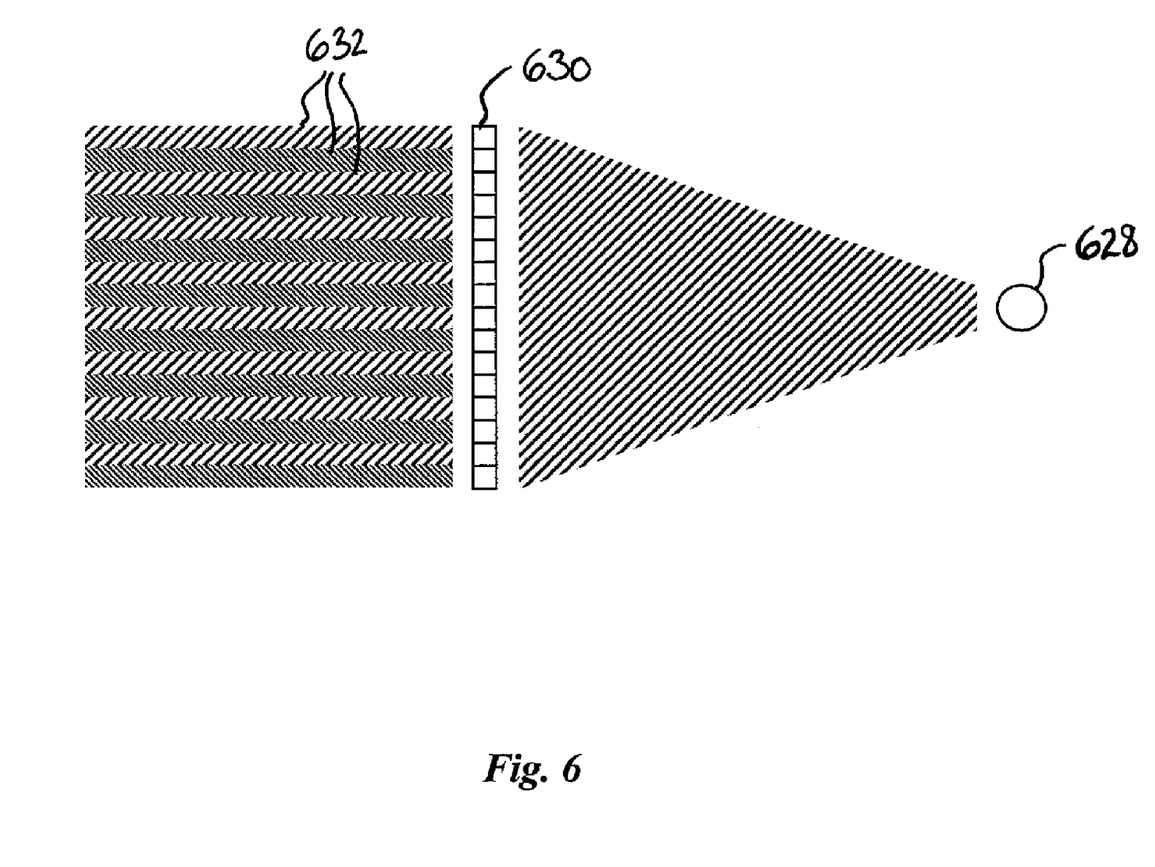
FIG. 6 is a schematic view of still another example illumination device to be used in the system of FIG. 1, wherein the illumination device comprises a single light sources combined with a spatial light modulator array.

FIG. 6 shows another example embodiment of the illumination device 12. In this embodiment, the illumination device 12 comprises a single light source 628 with a wide angular spread and a spatial light modulator array 630 coupled to the light source 628 so as to define an array of illumination zones 632 individually corresponding to points in the illumination figure.

In the configurations presented in FIGS. 3, 4, 5 and 6 the registration between the illumination field 16 and the sensing field of view 14 is generally obtained by designing the illuminating imaging optics and the sensor imaging optics so that the field of view of the illumination imaging optics match the field of view of the sensor imaging optics 26.

Figure 7:
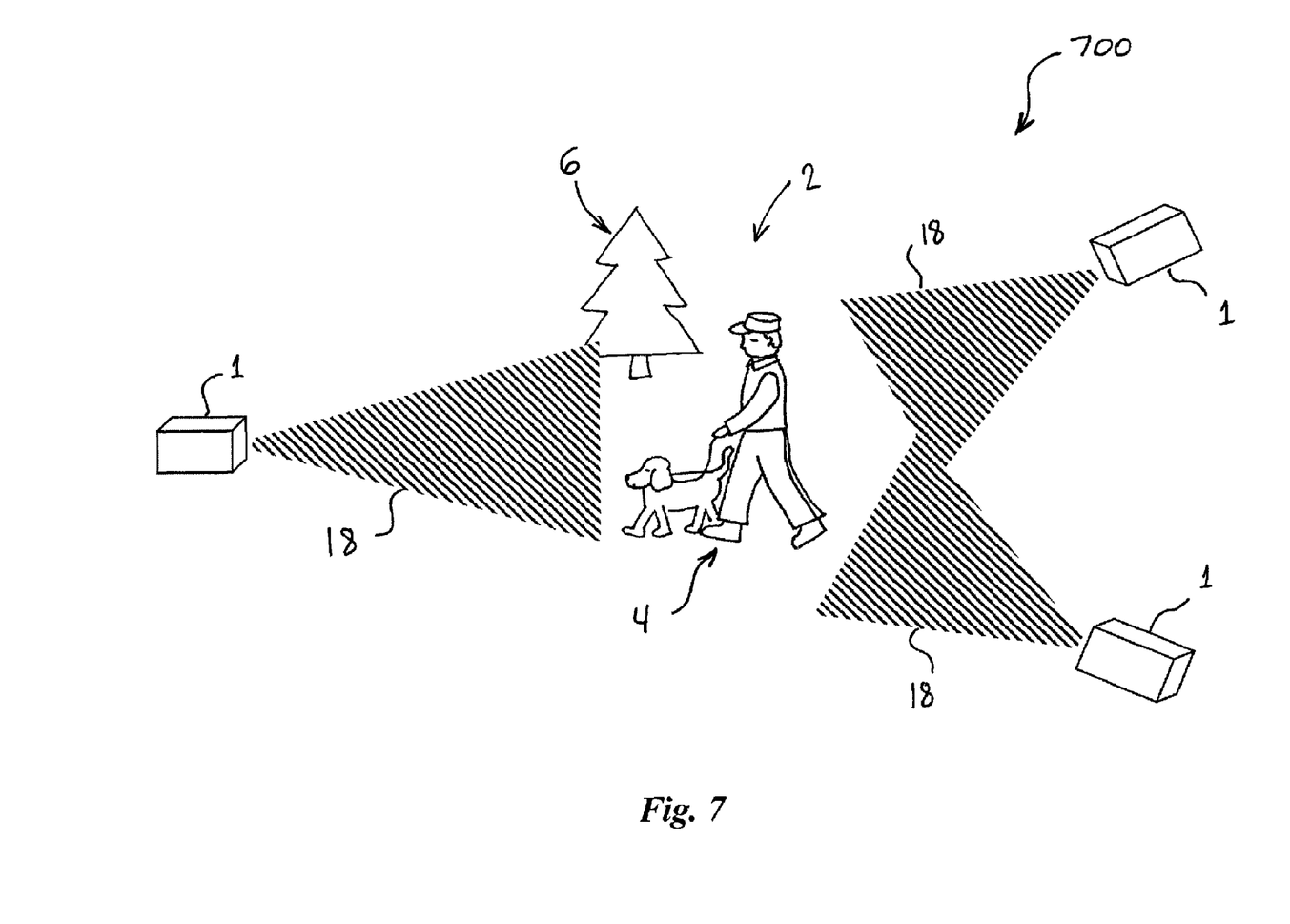
FIG. 7 is a schematic view illustrating a system which uses a plurality of the system of FIG. 1 to illuminate the target from different points.

FIG. 7 shows a system 700 which uses a plurality of the systems 1 as described herein, to illuminate the target 4 from different directions. The system 700 comprises a plurality of systems 1 positioned at different view points relative to the scene 2. Each system 1 extracts the positions and shapes of the target 4 from a different direction. The target 4 is then illuminated from different points. The systems 1 are thus intrinsically collaborative since the illumination adds up only on the target 4, producing an illumination contrast of the target 4 that is more intense and that covers larger proportions of the surface of the target 4, while the surrounding environment 6 still receives minimal illumination. The contrast between the target 4 and the surrounding environment 6 is thus increased. Moreover, the eventual lack of illumination from one system 1 is compensated by the illumination provided by the other systems 1.

It is noted that, while throughout the description the sensor array 24 and the illumination array 28 are considered to be two-dimensional arrays, one-dimensional arrays, i.e. lines, may also be used.

It is also noted that the sensing device 10 may consist of a three-dimensional scanner such as a stereoscopic sensor, acquiring three-dimensional images of the scene 2. In this case, the acquired three-dimensional information, i.e. the depth of the image, is used to extract the target 4 within the scene 2. In an example embodiment, anything appearing on the three-dimensional image closer than a given depth relative to the sensing device 10 is extracted as a target 4. The illumination device 12 then illuminates the target 4 which, in fact, consist of anything in the scene 2 that is closer than a depth threshold relative to the sensing device 10.

The sensing device 10 may also consist of a gas sensor, such as a LIDAR sensor, detecting the presence of a gas in the scene 2. In this case, when a gas other than normal atmosphere is detected in the scene 2 or when a specific gas is detected in the scene 2, the detected gas is extracted as a target 4. The illumination device 12 illuminates the target 4, consisting of a gas, which then shows as an illuminated cloud.

Both the sensor device 10 and the illumination device 12 may operate at various electromagnetic spectral wavebands. In the embodiments described herein, the sensor device 10 and the illumination device 12 operate in different electromagnetic wavebands. The system 1 uses information acquired in a first waveband in order to enhance the illumination contrast of the target 4 relative to the surrounding environment 6 in another waveband. It is however noted that the sensor device 10 and the illumination device 12 may rather operate in the same electromagnetic waveband. For example, the sensor device 10 may acquire color images in the visual spectrum while the illumination device 12 illuminates using white light sources.

It is noted that, in the embodiments described herein, the resolution of both the sensing device 10 and the illumination device 12 may be quite low while still achieving good target illumination accuracy. Both the sensor array 24 and the illumination array 28 can typically have a low pixel count. The purpose of the system 1 is to illuminate a target 4, with its shape, in order to enhance its visibility against the surrounding environment 6. As such, the whole target 4 to be illuminated may ultimately correspond to only a few pixels of the illumination array 28, as long as the target shape is generally preserved. In turn, the few pixels of the illumination array 28 may correspond to only few pixels of the sensor array 24. The resolution required is thus relatively low for both the illumination array 28 and the sensor array 24.

Even though the target 4 is fully illuminated with only a few activated pixels of the illumination array 28, i.e. a few light source elements, all details of the target 4 are still visible and the whole spatial resolution of the target 4 is fully available for the final observation, whether it is made by a human eye or an observation instrument. The resolutions of the sensor array 24 and of the illumination array 28, even if very low, do not have an impact on the final spatial resolution of the scene as observed. Consequently, with a suitable illumination intensity, the sensor array 24 and the illumination array 28 may have a low resolution without compromising the quality of the observation.

It is noted that while the use of a low resolution sensor array and of a low resolution illumination array has an important impact on size and cost of the system 1, high resolutions may also be used.

Using a low resolution for the sensor array 24 generates a reduced amount of data. The acquisition rate of the sensor array 24 can thus be increased without generating a too large amount of data. It also allows the use of an averaging technique on the acquired images such that acquired images are added over time to reduce the noise or to increase the sensitivity of the averaged image.

It will be understood that the sensing device 10 and the image processor may be provided separately from the system 1, the system 1 then comprising an illumination device 12, an illumination controller 22 and an input for receiving the image as acquired and processed.

The applications of the system 1 are various. The system 1 may be used in perimeter security and surveillance, for use in the open areas and at the outside of a prison for example. The system 1 may continuously look for a being, which will be considered as a target. The system then automatically tracks the target by illuminating it as it moves. Similarly, the system 1 may also be used on a private outdoor property to surprise a person who may be trespassing on the property. The system 1 may also be used in police pursuits, police search operations and search and rescues.

In another example application, the system 1 may be mounted to a car in replacement of or in addition to the car's headlights, in order to improve visibility in adverse conditions. It may also be added to or integrated in a fire fighting equipment to improve visibility in adverse visibility conditions.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and the data paths illustrated being implemented by data communication within a computer application or operating system. The structure illustrated is thus provided for efficiency of teaching the described embodiment.

The embodiments described above are intended to be exemplary only. The scope of the invention is therefore intended to be limited solely by the appended claims.

What is claimed is:

1. A system for illuminating at least one target in a scene, the system comprising:
    an input for receiving an image acquired on said scene, said image comprising said target;
    an illumination device having an illumination field and adapted to illuminate a selected portion only of said illumination field according to an illumination figure for selectively illuminating said target in said illumination field; and
    an illumination controller for determining said illumination figure from said image such that said portion adaptively matches at least a position of said target in said image, said illumination figure being determined according to a known registration between said image and said illumination field.

2. The system as claimed in claim 1, wherein said input is to receive said image updated in time and wherein said illumination figure is updated in time as a function of said image such that said illumination figure tracks said target as it moves in the scene.

3. The system as claimed in claim 1, further comprising a sensing device for acquiring said image.

4. The system as claimed in claim 3, wherein said sensing device is an infrared sensor.

5. The system as claimed in claim 3, wherein said sensing device operates in at least one of the x-ray spectrum, the ultra-violet spectrum, the near-infrared spectrum, the mid-infrared spectrum, the long-infrared spectrum and the terahertz spectrum.

6. The system as claimed in claim 3,
    wherein said sensing device comprises a sensor array defining an array of sensor pixels, said sensor pixels individually corresponding to points in said image; and
    wherein said registration comprises a correspondence between points in said image and points in said illumination figure.

7. The system as claimed in claim 1, further comprising: an image processor for processing said image to extract a shape and said position of said target in said image.

8. The system as claimed in claim 1, wherein said illumination device comprises an array of light sources, said light sources individually corresponding to points in said illumination figure.

9. The system as claimed in claim 1, wherein said illumination device comprises a single light source and a spatial light modulator array coupled thereto to define an array of illumination zones individually corresponding to points in said illumination figure.

10. The system as claimed in claim 1, wherein said illumination device comprises at least one of a laser diode, a light emitting diode and a light bulb.

11. A system comprising a plurality of sub-systems as the system claimed in claim 1, wherein the sub-systems are positioned at different view points relative to the same one of said scene.

12. A method for illuminating at least one target in a scene, the method comprising:
    acquiring an image of said scene, said image comprising said target;
    determining, from said image, an illumination figure defined on an illumination field, such that said illumination figure adaptively matches at least a position of said target in said image, said illumination figure being determined according to a known registration between said image and said illumination field; and
    illuminating a selected portion only of said illumination field according to said illumination figure for selectively illuminating said target in said illumination field.

13. The method as claimed in claim 12, wherein said acquiring comprises updating said image in time and wherein said determining comprises updating said illumination figure in time such that said illumination figure tracks said target as it moves in the scene.

14. The method as claimed in claim 12, further comprising: processing said image to extract a shape and said position of said target in said image.

15. The method as claimed in claim 12, wherein said illuminating a portion comprises: activating part of an array of light sources so that said target is selectively illuminated in said illumination field, said light sources individually corresponding to points in said illumination figure.

16. The method as claimed in claim 12, wherein said acquiring an image comprises acquiring an infrared radiation of said scene.

17. The method as claimed in claim 12, wherein said illuminating a portion only of said illumination field comprises emitting a light in the visible spectrum.

* * * * *